United States Patent [19]
Takai et al.

[11] Patent Number: 5,612,829
[45] Date of Patent: Mar. 18, 1997

[54] DATA RECORDING CONTROL METHOD OF MAGNETIC TAPE

[75] Inventors: Nobuyuki Takai; Kazufumi Hiyamizu, both of Kawasaki, Japan

[73] Assignee: Fujitsu Limited, Japan

[21] Appl. No.: 24,648

[22] PCT Filed: Jul. 21, 1992

[86] PCT No.: PCT/JP92/00926

§ 371 Date: Mar. 1, 1993

§ 102(e) Date: Mar. 1, 1993

[87] PCT Pub. No.: WO93/02410

PCT Pub. Date: Feb. 4, 1993

[30] Foreign Application Priority Data

Jul. 22, 1991 [JP] Japan .................................. 3-205436

[51] Int. Cl.$^6$ ........................................................ G11B 5/02
[52] U.S. Cl. ............................................... 360/54; 360/48
[58] Field of Search ................................. 360/54, 13, 48, 360/74.1, 74.4, 24; 395/894

[56] References Cited

U.S. PATENT DOCUMENTS

| | | |
|---|---|---|
| 3,916,382 | 10/1975 | Martin et al. .............................. 395/250 |
| 4,500,965 | 2/1985 | Gray ........................................... 364/400 |
| 5,113,509 | 5/1992 | Pennings et al. ........................ 395/857 |

FOREIGN PATENT DOCUMENTS

| | | |
|---|---|---|
| 0324542 | 1/1989 | European Pat. Off. . |
| 323890 | 7/1989 | European Pat. Off. ............... 360/72.1 |
| 58-219660 | 12/1983 | Japan . |
| 62-97020 | 5/1987 | Japan . |
| 62-239226 | 10/1987 | Japan . |

*Primary Examiner*—Aristotelis Psitos
*Assistant Examiner*—James T. Wilson
*Attorney, Agent, or Firm*—Greer, Burns & Crain, Ltd.

[57] ABSTRACT

The present invention pertains to a data recording control method of a magnetic tape in which tape a data, constructed by combining a plurality of packets into physical blocks, is recorded, the method being such that: the entire physical block of data is read from a magnetic tape and store in a buffer, when a command for reading a data corresponding to a packet in the physical block is output from a host unit; a new physical block is created by reorganizing the data in the buffer and the data to be recorded, when a write command and the data to be recorded are output from the host unit at any position in the physical block on the magnetic tape; and the data thus reorganized into a physical block is recorded on the magnetic tape.

15 Claims, 16 Drawing Sheets

DATA RECORDING CONTROL METHOD OF MAGNETIC TAPE

FIELD OF THE INVENTION

The present invention relates to a data recording control method of a magnetic tape, and more particularly to a data recording control method applied to a magnetic tape system in which data recording is conducted according to an extended data recording method.

BACKGROUND ART

A magnetic tape subsystem is generally composed of: a magnetic tape apparatus including a magnetic tape, a tape head, and a tape loading mechanism; and a magnetic tape control apparatus. The magnetic tape control apparatus performs a control of a magnetic tape apparatus, which control is required when data are recorded on a magnetic tape (data write), or when data on a magnetic tape are read.

A method called "an extended data recording method" has been proposed as a method of recording data on a magnetic tape. This "extended data recording method" was proposed by ANSI (American National Standard Institution) in 1989 as a method to increase storage capacity per a cartridge tape. The contents of the proposal by ANSI are contained in the following handbook.

"X3B5 EXTENDED MAGNETIC TAPE FORMAT FOR INFORMATION INTERCHANGE 18-TRACK, PARALLEL, 12.65 MM (½ in), 1491 CPMM (37 871 cpi) Group-Coded Recording".

A description will now be given of the "extended data recording method" described in this handbook, with reference to FIGS.1 and 2.

In the "extended data recording method", data are recorded on a magnetic tape in accordance with an extended data format as shown in FIG.1. Referring to FIG. 1, a data block recorded on a magnetic tape is composed of a plurality of packets and a count field. The data block has a data block ID and a pad positioned after it. The data block ID is composed of a sector number, an identification code, and a physical block ID. Each packet is composed of a packet header (PH), a data, and a packet trailer (PT), the details of the packet format being shown in FIG.2. Referring to FIG. 2, the packet header PH is composed of a block ID, a packet offset, a packet trailer length, a flag, a reserve, and a CRC (error correcting code), the block ID being composed of an identification code, a sector number, and a logical record ID. The packet trailer PT provided in a non-compressed data packet and the packet trailer PT provided in a compressed data packet have different compositions. The packet trailer PT provided in the non-compressed data packet is composed of a trailer pad and a packet CRC, while the packet trailer PT provided in the compressed data packet is composed of a logical block length, a logical block CRC, a compressed data block CRC, a trailer pad, and a packet CRC. The packet header PH and the packet trailer PT of each packet are the information required when restoring data read from a magnetic tape to an original data, and are formed at the time of data recording so as to be added before and after the data respectively.

In accordance with the above-mentioned extended data format, it is possible to decrease the number of IBG (interblock gap) which have to be provided between data blocks, because a plurality of packets are combined into one physical block, and data are recorded on a magnetic tape in units of this physical block (data block). As a result of this decrease, the storage capacity per a magnetic tape can be increased.

In order to record data on a magnetic tape in accordance with the above-described "extended data recording method", the magnetic tape control apparatus needs to be equipped with a function called autoblocking. This autoblocking is a kind of data compression technology. In response to a data read/write command given from a host computer for packet units, i.e., for logical block units, the magnetic tape control apparatus processes, by means of this autoblocking function, reads/writes data in the above-mentioned physical block units. For example, when the magnetic tape control apparatus receives a write command WR and data from the host computer, data are recorded on a magnetic tape in the following manner.

Data received from the host computer is compressed, and a packet is formed by adding the packet header PH and the packet trailer PT to the compressed data. A plurality of packets thus formed ($P_1$, $P_2$, $P_3$, $P_4$, $P_5$) are combined into one physical block. The data block ID, etc., are added to this one physical block, the result of the addition being written on the magnetic tape. The sequential recording on a magnetic tape is effected such that an IBG is provided for each physical block.

When the magnetic tape control apparatus receives a read command from the host computer, data are read from the magnetic tape in physical block units, and original data are restored from the read data, using such information as the packet header PH and the packet trailer PT. As described before, a data format exchanged between the host computer and the magnetic tape control apparatus is not an extended data format. Also, the read/write command (RD, WR) from the host computer is issued to be executed on each packet of data, i.e., on each logical block unit. On the other hand, the magnetic tape control apparatus effects a read/write process for each physical block unit. Accordingly, in the case where the data having a physical block composed of five packets $P_1$–$P_5$ is recorded on the magnetic tape, as is shown in FIG. 3, and a first read command RD is executed on the packet $P_1$ data, a second read command RD on the packet $P_2$ data, and a third read command RD on the packet $P_3$ data, in a sequential manner, the magnetic tape control apparatus reads (stores in a buffer) the physical block composed of the packets $P_1$–$P_5$ upon receipt of the first read command RD. Thereupon, in correspondence to the first, second, and third read commands, only the data in the packets $P_1$, $P_2$, and $P_3$ are fetched and restored to the original data. The restored data (read data) are then sent to the host computer.

When a write command WR to be executed on the packet $P_4$ is issued from the host computer immediately after the third read command RD is executed, the magnetic tape control apparatus cannot execute this write command since the apparatus is not capable of processing a write operation at packet unit level.

Accordingly, a data recording control method is possible in which this write command, issued immediately after the execution of the read command, is made executable by reorganizing the data in the physical block to be processed. Such a control method is schematically shown in FIGS. 4 and 5.

As shown in FIG.4, when write commands are ④–⑨ sequentially issued after read commands ①–③ are executed on the data in the packets $P_1$–$P_3$ belonging to the physical block consisting of five packets $P_1$–$P_5$, the following processes are effected.

First, when the read command ① on the data in the packet $P_1$ is executed, the tape head reads, from the magnetic tape, all the data in the physical block consisting of the packets $P_1$–$P_5$, and the read data are then stored in the buffer, as shown in FIG.5 ①. The data in the packet $P_1$ is transferred from the buffer to the host computer, in correspondence to the read command RD ①. As shown in FIG. 5 ② and ③, when the read commands RD ② and ③ are executed, the data in the packets $P_2$ and $P_3$ are transferred, in response to these commands, from the buffer to the host computer in a sequential manner. When a write command WR ④ is output from the host computer, the tape head is positioned at the packet $P_1$ residing on the magnetic tape (④-1). Since the data in the packets $P_1$–$P_3$ need to be retained as they are on the magnetic tape, the data in the packets $P_1$–$P_3$ in the buffer are written unmodified on the magnetic tape via the tape head, as shown in FIG. 5 ④-2. A new data $P_{4N}$, output together with the write command WR ④ from the host computer, is stored in the buffer as shown in FIG. 5 ④-3. Thereafter, when write commands WR ⑤, ⑥, ⑦ and ⑧ are sequentially output from the host computer, new write data $P_{5N}$, $P_{6N}$, $P_{7N}$, and $P_{8N}$, output together with these write commands from the host computer, are sequentially stored in the buffer (FIG. 5 ⑤-⑧-1). When the quantity of write data fulfills a predetermined condition (close condition), an IBG is provided after the data block consisting of the packets $P_1$, $P_2$, and $P_3$, after which the data $P_{5N}$–$P_{8N}$ fulfilling that condition are written on the magnetic tape via the tape head (FIG. 5 ⑧-2).

By performing the data block reorganization according to the above-described procedure, when the write command WR is executed immediately after the execution of the read command RD in one given physical block, data recording on the magnetic tape in accordance with an "extended data recording method" is achieved.

However, when the write command WR is executed immediately after the execution of the read command RD, generation of one physical block consisting of the data ($P_1$, $P_2$, $P_3$) that have been read up to that point is compelled, thus causing the data length of the physical block thus generated to be smaller than a data length of a normal physical block. This has a disadvantage in that the number of IBGs tends to be substantially large, and data storage capacity per a magnetic tape becomes is reduced, if the read command RD and the write command WR are repeated.

DISCLOSURE OF THE INVENTION

Accordingly, a general object of the present invention is to provide a novel and useful data recording control method of a magnetic tape, in which method the above-described disadvantages of the conventional art are eliminated.

Another object of the present invention is to provide a data recording control method in which method data recording control using a so-called autoblocking function can be effected at any position in a given data block residing on the magnetic tape.

Still another object of the present invention is to provide a data recording control method in which the number of IBGs that need to be recorded on a magnetic tape can be decreased and the storage capacity of the magnetic tape can be increased.

The above objects can be achieved by a data recording control method of a magnetic tape in which tape data, constructed by combining a plurality of packets into a physical block, is recorded, each packet corresponding to a data unit handled by a host unit issuing a read command and a write command applied to a magnetic tape, the method comprising steps of:

(a) reading, from the magnetic tape, when a read command, for reading data, applied to a packet in the physical block, is output from the host unit, the data in the entire physical block including that packet, and storing the same in a buffer;

(b) reorganizing, at any position in the physical block on the magnetic tape, the physical block using the data in the buffer and the data to be recorded, when a write command and the data to be recorded are output from the host unit; and (c) recording, on the magnetic tape, the data thus reorganized into one new physical block.

According to the present invention, a data recording control using a so-called autoblocking function can be effected at any position in a data block residing on the magnetic tape. Further, the data length of the physical block can be made larger than in the conventional art because the present invention allows for a physical block reorganization using the data stored in the buffer that do not need to be rewritten and the new data that need to be recorded. Consequently, the number of IBGs that need to be recorded on the magnetic tape can be decreased, and the storage capacity per a magnetic tape can be increased.

BEST MODE OF CARRYING OUT THE INVENTION

A description will now be given of the principle of an embodiment of the present invention with reference to FIG.6.

Figure 6:
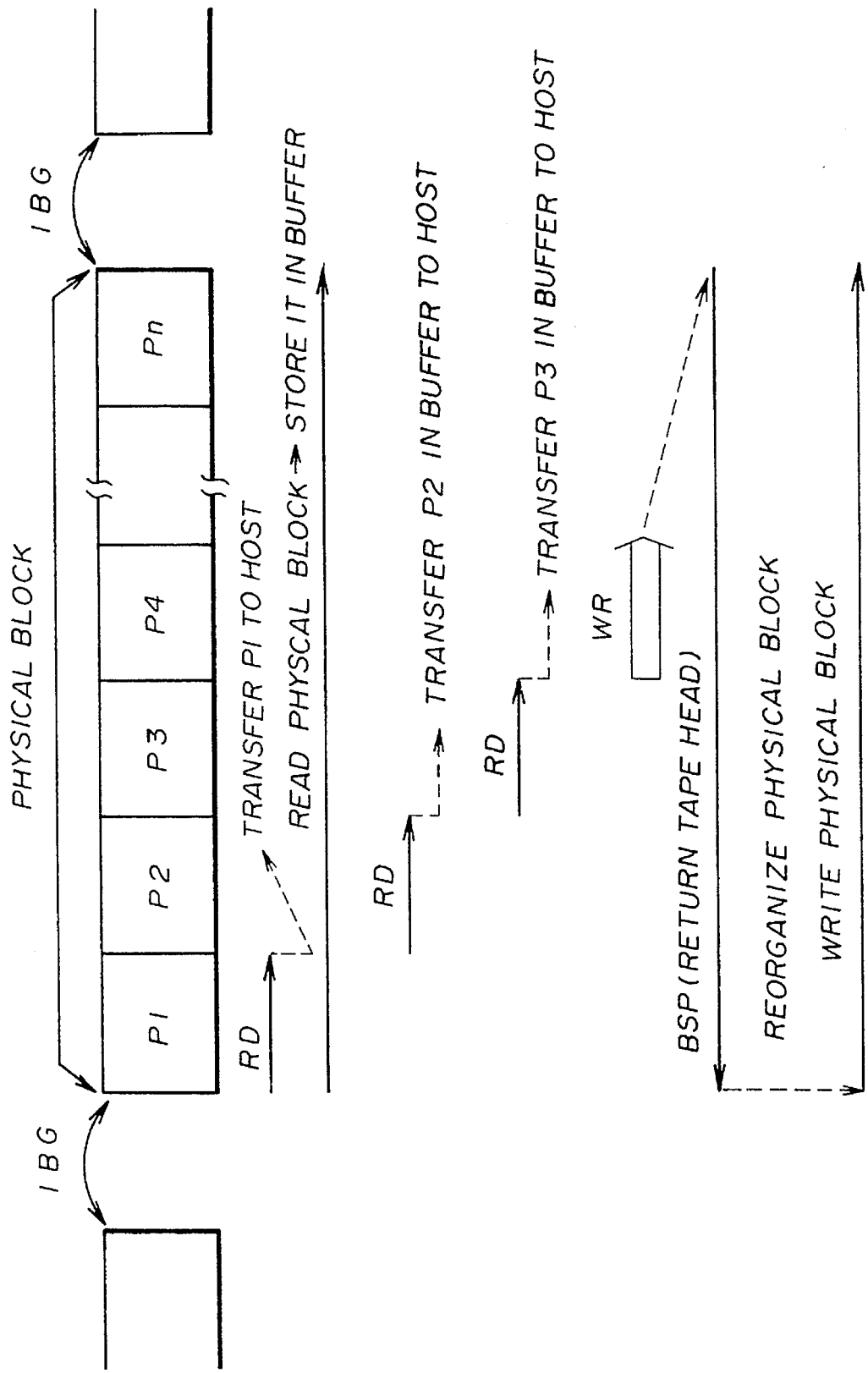
FIG. 6 illustrates a data recording control method according to the present invention.

Referring to FIG.6, data constructed by combining a plurality of packets $P_1-P_N$ into physical blocks, is recorded on a magnetic tape. Each of the packets $P_1-P_3$ corresponds to a logical block (a data unit exchanged between the host computer and the magnetic tape control apparatus). The host computer issues read/write commands (RD/WR) on the data corresponding to each of these packets.

The magnetic tape control apparatus reads the data in the physical block including the packet $P_1$, and the read data are stored in the buffer. The data in the packet $P_1$ is transferred from the buffer to the host computer. Subsequently, when the magnetic tape control apparatus receives the read commands RD on the packets $P_1$, $P_2$, and $P_3$, the data in the packets $P_1$, $P_2$, and $P_3$ are sequentially fetched from the buffer and transferred to the host computer. Thereafter, when the magnetic tape control apparatus receives the write command WR issued from the host computer so as to renew the data in the packet $P_4$, a back space operation (BSP) causes the tape head to be positioned at the head of the physical block. Then the data in the buffer, and the data issued from the host computer together with the write command WR, are used to reorganize the packet data in accordance with the "extended data format". The data thus reorganized are recorded via the tape head on the magnetic tape in physical block units.

Such a procedure ensures that data recording on the magnetic tape according to the "extended data recording method" can be effected efficiently even when, in one given physical block, the read command is followed by the write command.

A detailed description will now be given of an embodiment of the present invention.

Figure 7:
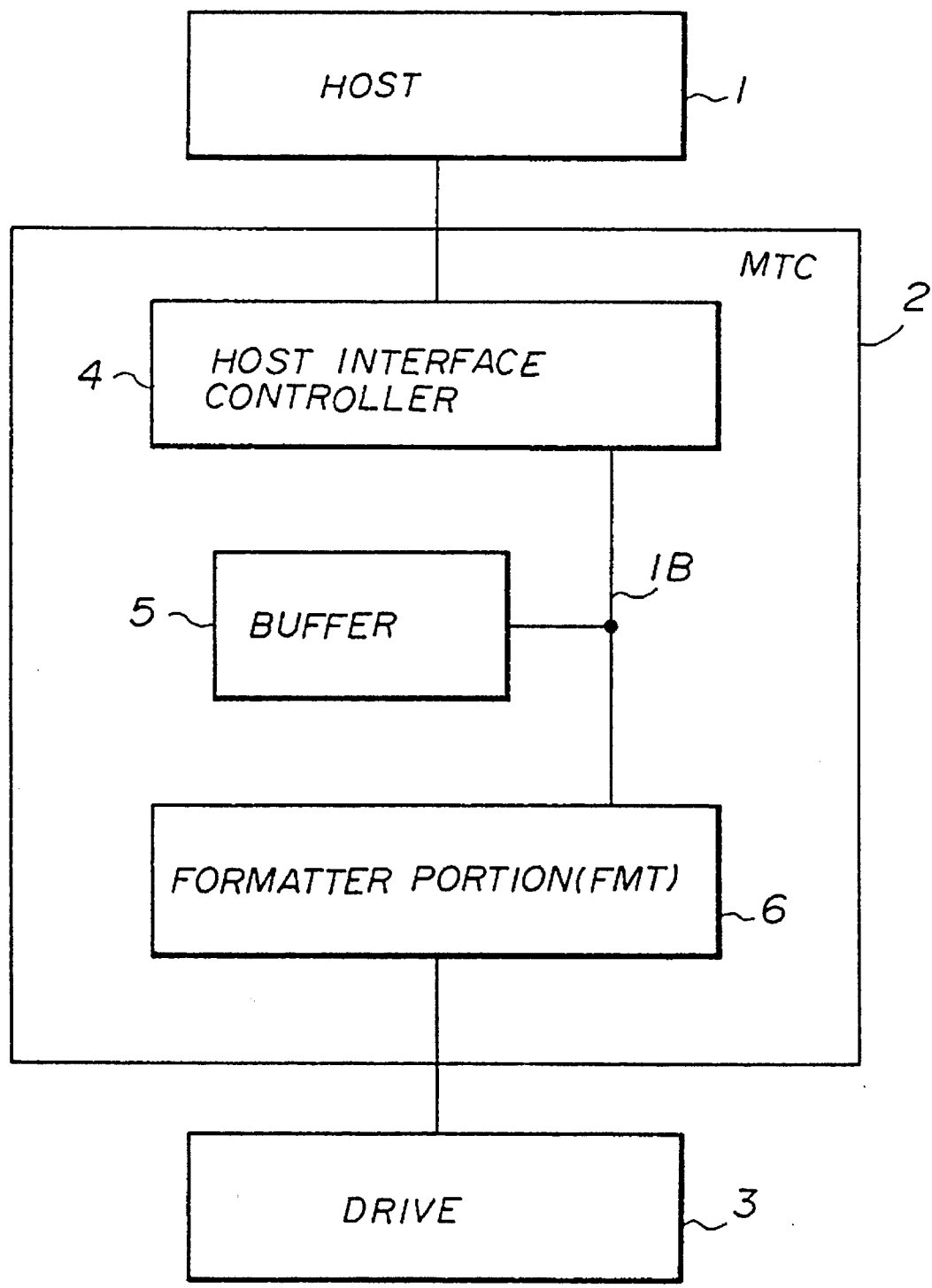
FIG. 7 is a block diagram illustrating a schematic configuration of a magnetic tape control apparatus of the described embodiment of the present invention.

The magnetic tape control apparatus, for conducting data recording control in accordance with the data recording control method of the present invention, is configured as shown, for example, in FIG.7. Referring to FIG.7, a magnetic tape control apparatus (MTC) 2 is equipped with a host interface controller (HIC) 4, a buffer 5, and a formatter portion 6. The host interface controller 4, the buffer 5, and the formatter portion 6 are interconnected via an internal bus IB. The host interface controller 4 is connected to a host computer 1, and the formatter portion 6 is connected to a drive 3 for driving, for example, the magnetic tape and the tape head. The host interface controller 4 and the formatter portion 6 performs various processes in an asynchronous manner. Data are exchanged between the host interface controller 4 and the formatter portion 6 via the buffer 5. For example, the data processed in the host interface controller 4 is stored in the buffer 5, and the formatter portion 6 fetches the data stored in the buffer 5 and processes the same. An autoblocking function is realized by the host interface controller 4, the buffer 5, and the formatter portion 6, which are connected via the internal bus IB.

Figure 8:
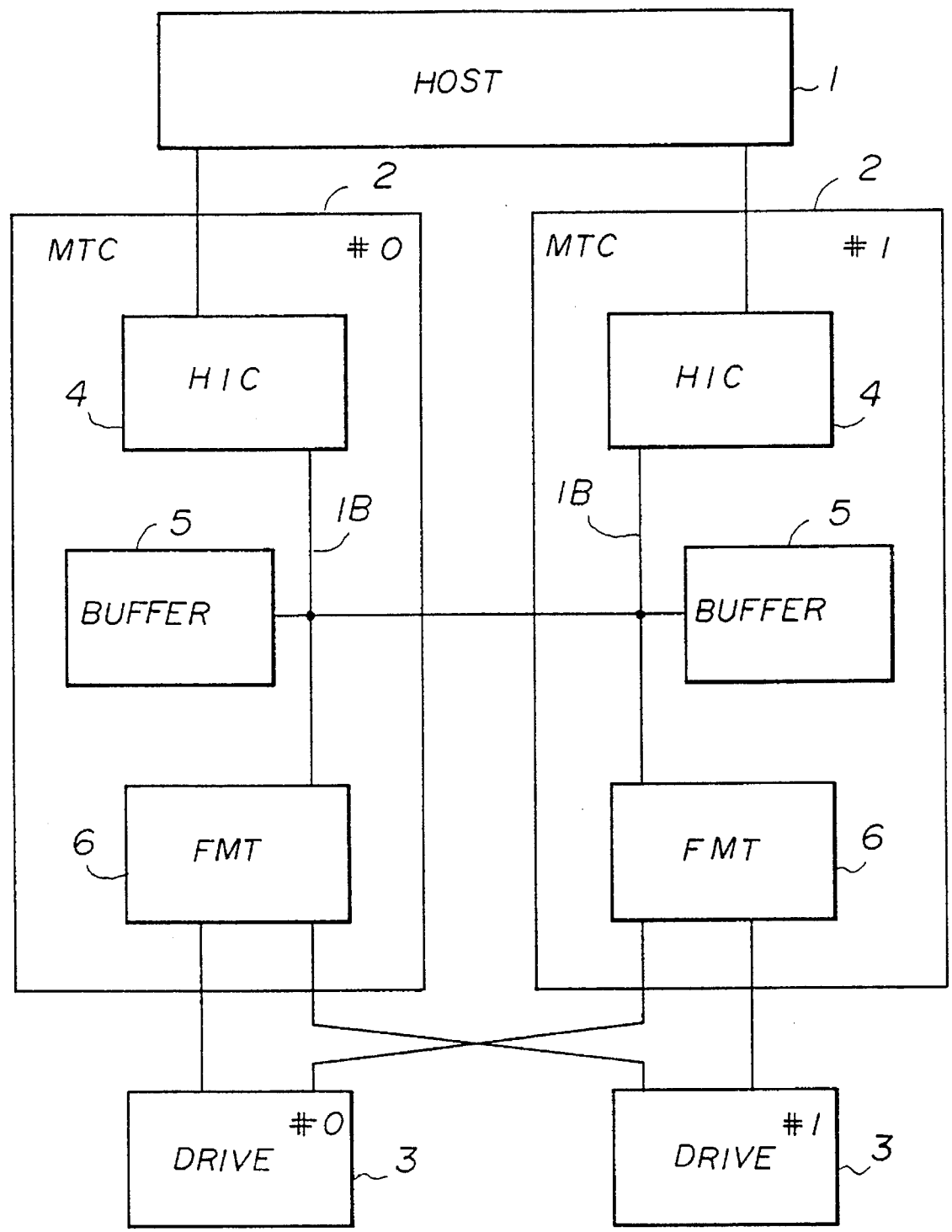
FIG. 8 is a block diagram illustrating another schematic configuration of the magnetic tape control apparatus of the described embodiment of the present invention.

As shown in FIG.8, it is possible to configure a close call system by using two magnetic tape control apparatuses. Referring to FIG.8, the system comprises two magnetic tape control apparatuses 2 (#0, #1), and two drives 3 (#0, #1). The respective internal buses IB in the magnetic tape control apparatuses 2 (#0, #1) are interconnected. The respective formatter portions 6 in the magnetic tape control apparatuses are respectively connected to the two drives 3.

Figure 9:
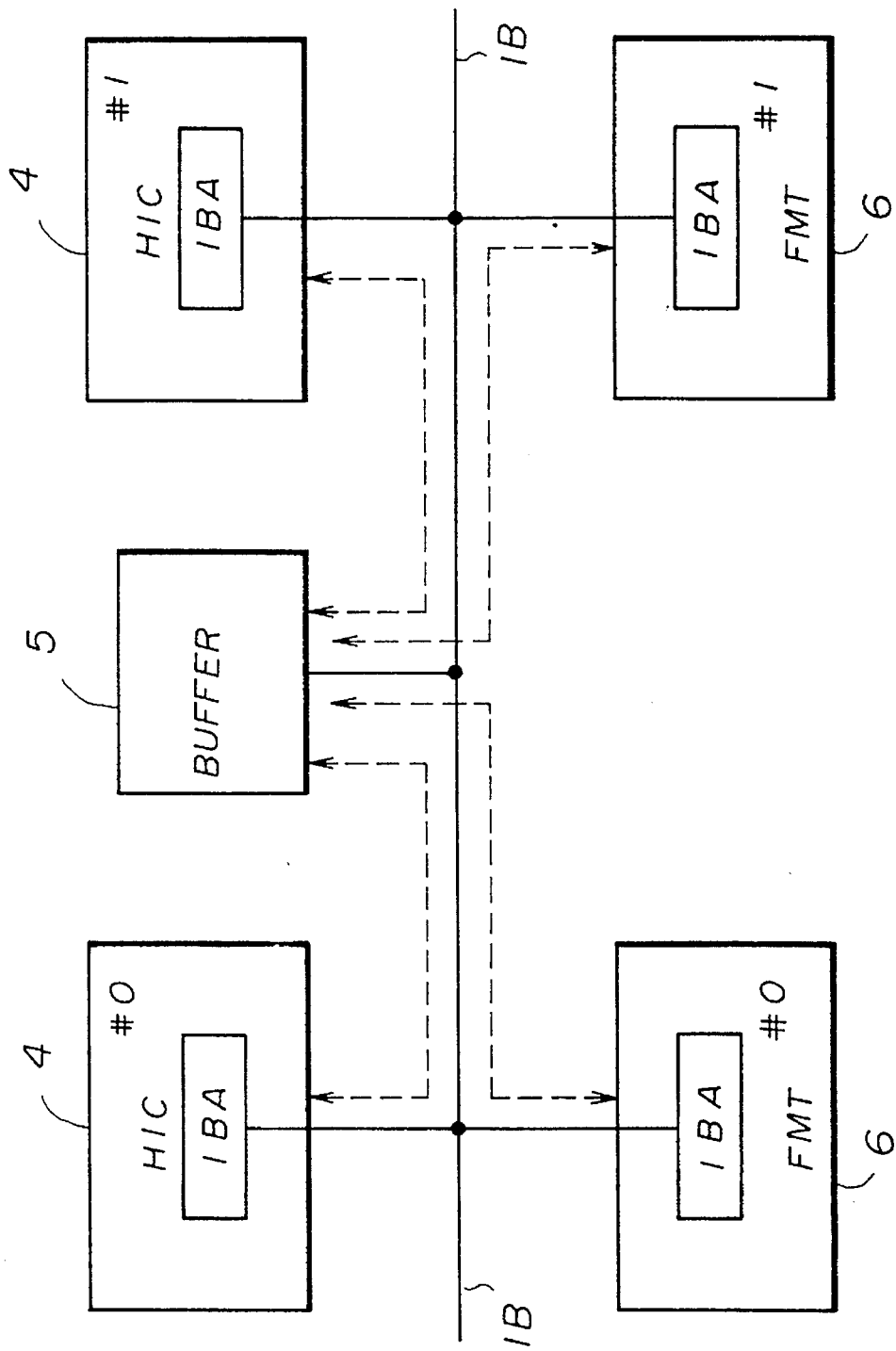
FIG. 9 illustrates a data flow in the magnetic tape control apparatus shown in FIG.8.

In the close call system as shown in FIG.8, data are transferred in each magnetic tape apparatus via a channel as shown in FIG.9. While FIG.9 shows a data flow relative to just one of the two buffers 5, a data flow relative to the other buffer 5 is the same as that of the former one. For example, both of the host interface controllers 4 (#0, #1) store the processed data in the buffer 5. Subsequently, the formatter portion 6 accesses the buffer 5, thereby fetching and processing the data stored in the buffer 5. Data transfer therein is effected via the internal bus IB, using an internal bus adapter IBA.

One possible configuration of the above magnetic tape control apparatus will be described in detail with reference to FIG.10.

Figure 10:
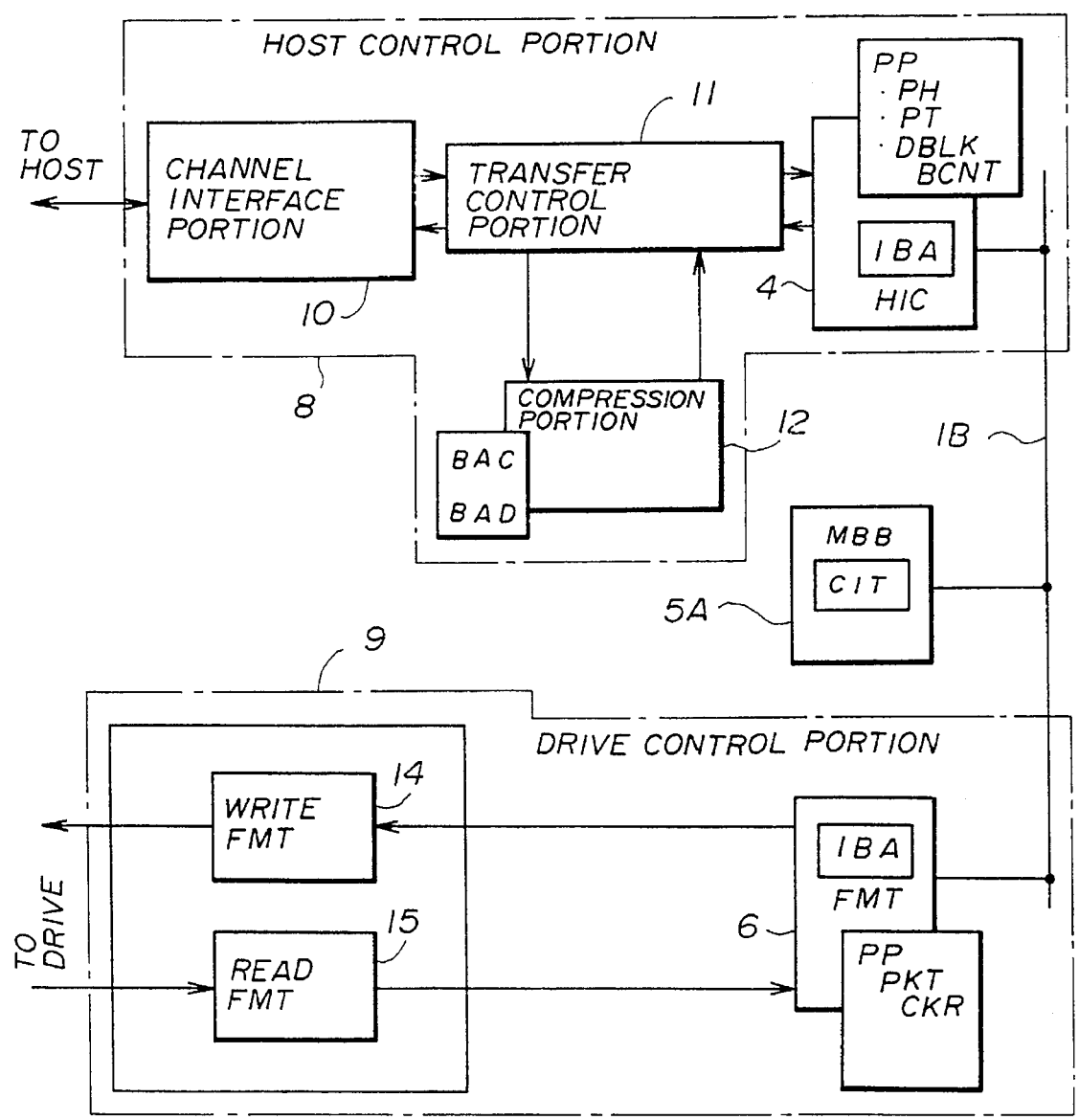
FIG. 10 is a block diagram illustrating a detailed configuration of the magnetic tape control apparatus.

Referring to FIG. 10, the magnetic tape control apparatus is equipped with a host control portion 8, a drive control portion 9, and a multi-block buffer (MBB) 5A. The host control portion 8 is provided with a channel interface portion 10, a transfer control portion 11, a compression portion 12, and the host interface controller 4. The drive control portion 9 is provided with the formatter portion 6, a write formatter 14, and a read formatter 15. The above-mentioned channel interface portion 10 effects an interface control, for example, between the host control portion and a channel provided in the host computer. The transfer control portion 11 effects data transfer control. The compression portion 12 is equipped with a binary arithmetic coder BAC and a binary arithmetic decoder BAD, and processes a data compression. The host interface controller 4 (HIC) is equipped with the internal bus adapter IBA and a packet processor PP. The packet processor PP effects processes including those processes related to the packet header PH and the packet trailer PT, as well as a byte count of data blocks (DBLK BCNT). The multi-block buffer (MBB) 5A is equipped with a control information table CIT. This control information table CIT stores various items of control information required when the host control portion 8 and the drive control portion 9 conduct data transfer via the multi-block buffer 5A. The formatter portion 6 is equipped with the internal bus adapter IBA and the packet processor PP. This packet processor PP is equipped with a packet checker function PKT CKR for detecting a packet. The write formatter 14 converts a write data format into a format recordable on a magnetic tape. The read formatter 15 converts a format of a read data read from the magnetic tape into a format that can be handled in a system.

The magnetic tape control apparatus of the above-described configuration effects autoblocking of data, and enables data recording control in accordance with the "extended data recording method".

Figure 11:
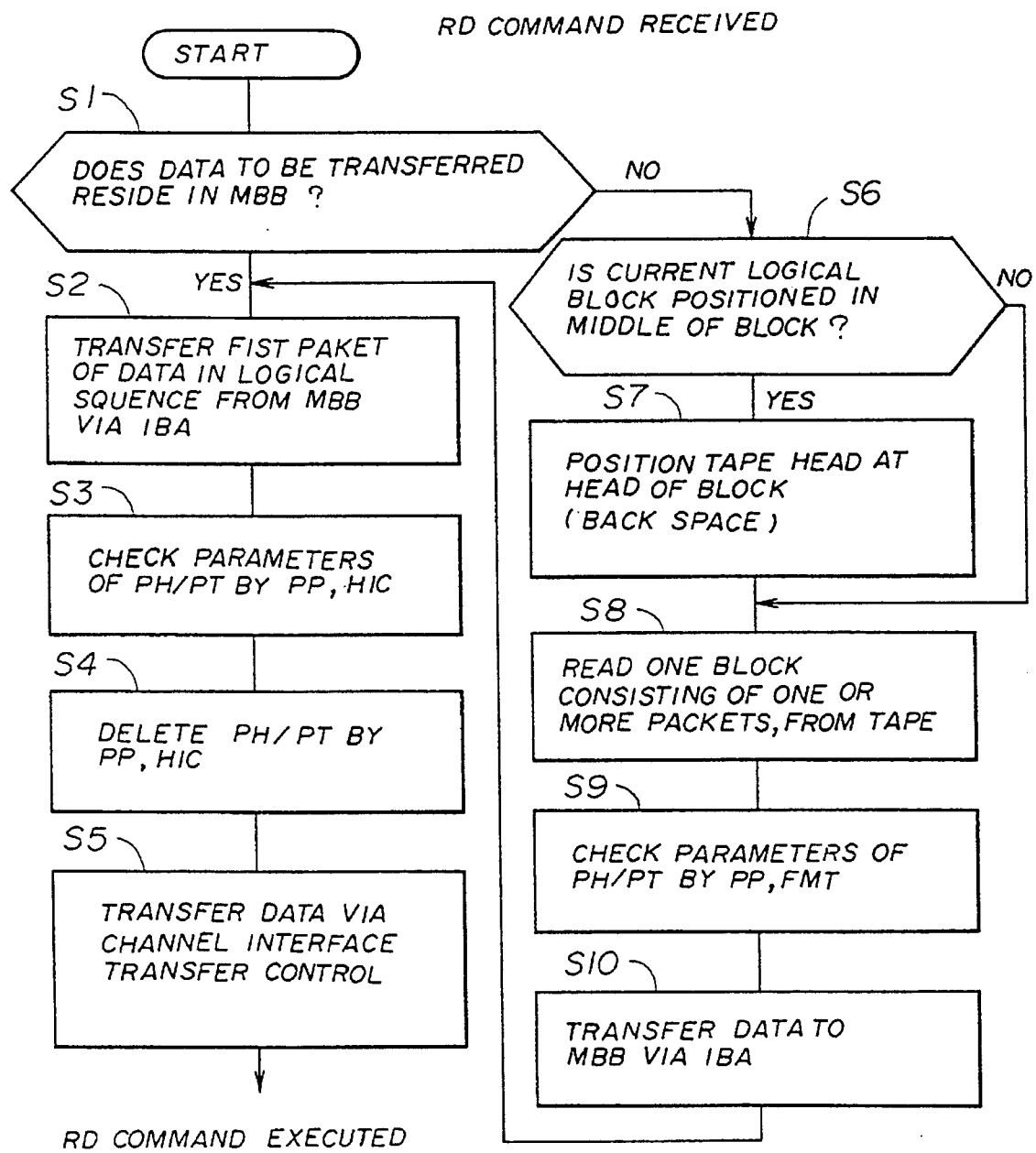
FIG. 11 is a flow chart showing how a read command is processed.

Upon receipt of the read command RD from the host computer, the above-described magnetic tape control apparatus conducts a process according to the flow chart shown in FIG.11.

The host control portion 8 determines whether or not the data to be transferred to the host computer resides in the multi-block buffer 5A (step $S_1$). If the data to be transferred resides in the multi-block buffer 5A, the first packet of data in a logical sequence is transferred from the multi-block buffer 5A to the host interface controller (HIC) 4 via the internal bus adapter IBA (step $S_2$). Thereafter, the host interface controller (HIC) 4 and the packet processor PP check the parameters of the packet header PH and the packet trailer PT of the transferred data (step $S_3$). Then the packet processor PP deletes the packet header PH and the packet trailer PT from the data (step $S_4$). The data, from which the packet header PH and the packet trailer PT are deleted, is then transferred to the host computer via the transfer control portion 11 and the channel interface portion 10 (step $S_5$).

In case it is determined in step $S_1$ that the multi-block buffer 5A does not contain any data to be transferred to the host computer, a determination is made as to whether or not the current logical block position (the position corresponding to the packet) is in the middle of the block (step $S_6$). When it is determined that the current logical block is positioned in the middle of the block, a back space (BSP) control for positioning the tape head at the head of the block is effected (step $S_7$). When the current logical block is not positioned in the middle of the block, this back space (BSP) control is not effected. Subsequently, one physical block of data consisting of one or a plurality of packets is read from the magnetic tape (step $S_8$). The formatter portion 6 checks the parameters of the packet header PH and the packet trailer PT of the read data (step $S_9$). Then the data is transferred from the formatter portion 6 to the multi-block buffer 5A via the internal bus adapter IBA, the data thus transferred being stored in the multi-block buffer 5A. Next, the data in the multi-block buffer 5A is transferred to the host computer in accordance with the processes from step $S_2$ to step $S_5$.

The above-described process conducted in response to the receipt of the read command RD is then completed.

Figure 12:
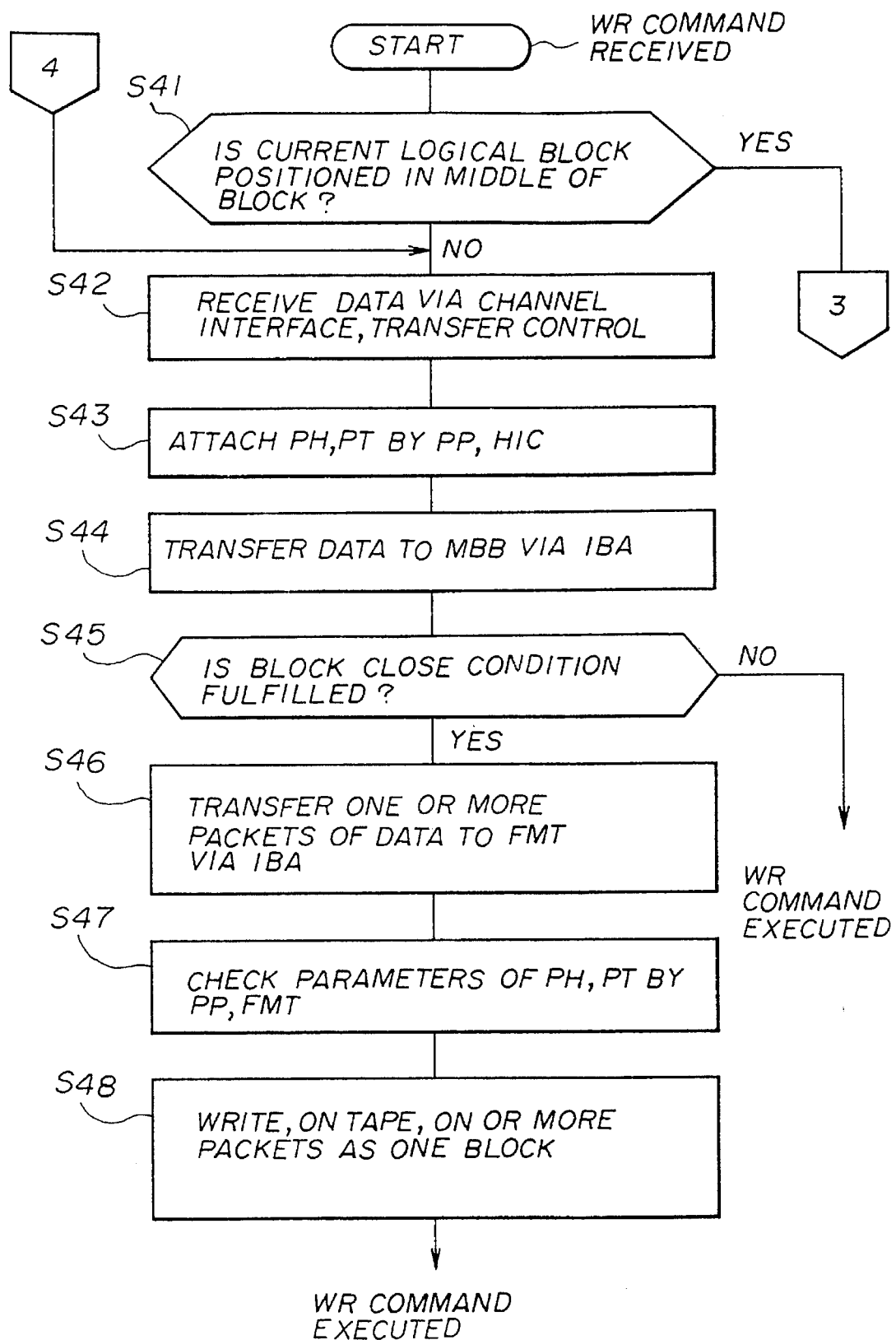
FIGS. 12 and 13 are flow charts showing how a write command is processed.
Figure 13:
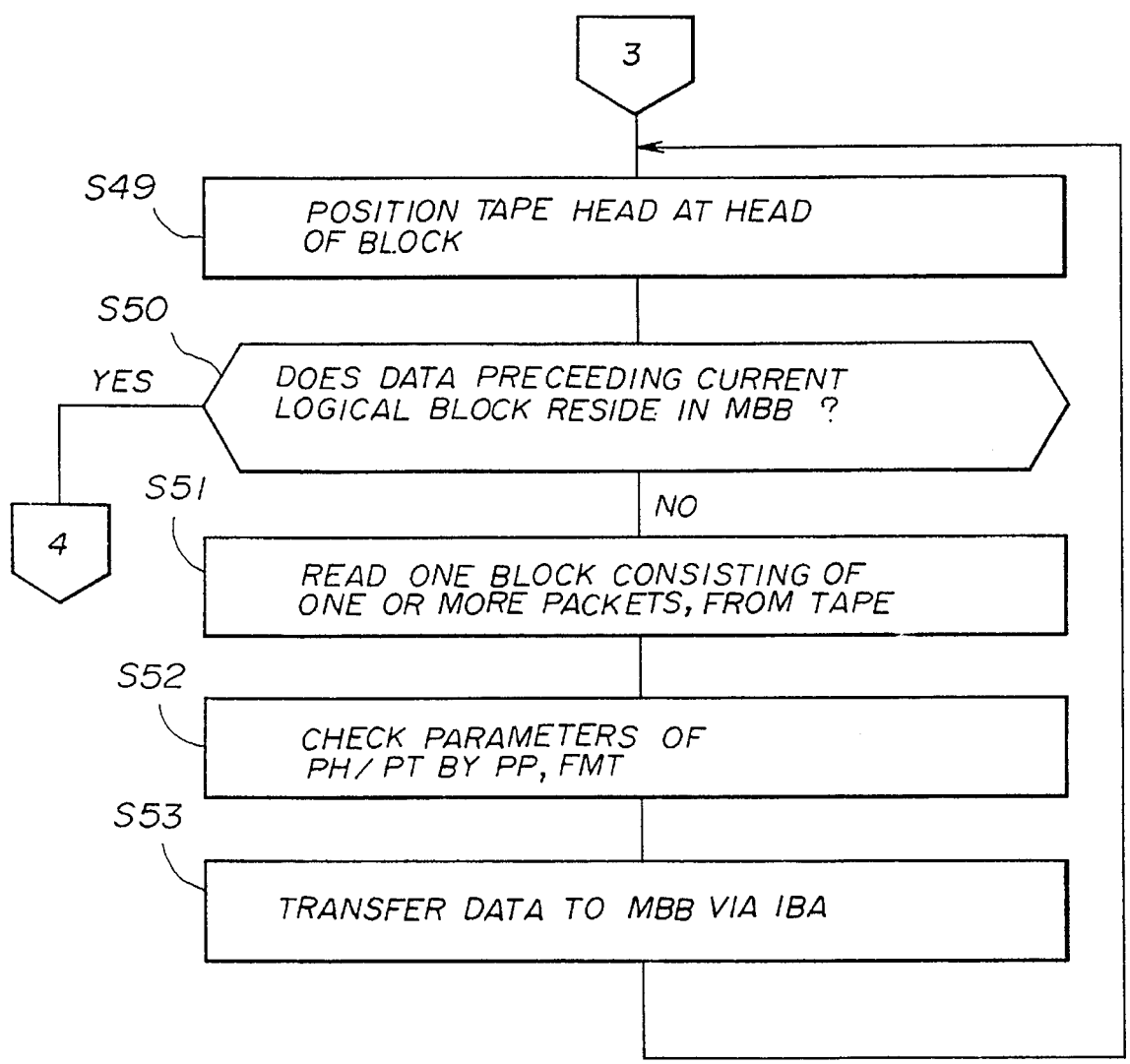

The magnetic tape control apparatus conducts process shown in FIGS.12 and 13 upon receipt of the write command WR from the host computer.

The host control portion 8 determines whether or not the current logical block is positioned in the middle of the block (step $S_{41}$). When it is determined that the current logical block is not positioned in the middle of the block, the write data supplied from the host computer together with the write command WR is transferred to the host control portion 8 via the channel interface portion 10 and the transfer control portion 11 (step $S_{42}$). The compression portion 12 compresses the transferred data in accordance with a predetermined algorithm. Further, the host interface controller 4 adds the packet header PH and the packet trailer PT to the compressed data so as to form a packet (step $S_{43}$). The packet thus formed is transferred from the host controller 4 to the multi-block buffer 5A via the internal bus adapter IBA, and is stored therein (step $S_{44}$). A determination is then made as to whether or not the data series stored in the multi-block buffer 5A fulfills a block close condition (step $S_{45}$). This block close condition is represented as $(P_{11} \ldots + P_n) + P_{MAX} \geq 65502$ (bytes), for example. The block close condition is fulfilled when the result of an addition of the data lengths of all the packets $P_1$–$P_n$ in the multi-block buffer 5A to the maximum data length $P_{MAX}$ from among the packets $P_1z$–$P_n$ exceeds 65502 bytes. That is, n packets $P_1$–$P_n$ constitute one physical block in this case.

When it is found that the block close condition is fulfilled, the packet of data, in the multi-block buffer 5A, fulfilling this close condition is transferred to the formatter portion 6 via the internal bus adapter IBA (step $S_{46}$). Then the packet processor PP in the formatter portion 6 checks the parameters of the packet header and the packet trailer PT of the data transferred (step $S_{47}$). The write formatter 14 then writes, as one physical block, the packet of data fulfilling the above close condition on the magnetic tape (step $S_{48}$).

In case it is determined in step $S_{41}$ that the current logical block is positioned in the middle of the block, the back space (BSP) control is effected for the purpose of positioning the tape head at the head of the block (step $S_{49}$). It is determined then whether or not the data, in the logical block preceding the position of the current logical block, resides in the multi-block buffer 5A (step $S_{50}$). If the data in the logical block preceding the position of the current logical block does not reside in the multi-block buffer 5A, one physical block of data consisting of one or a plurality of packets is read (step $S_{51}$). After the formatter portion 6 checks the parameters of the packet header PH and the packet trailer PT of the read data (step $S_{52}$), the data is transferred to the multi-block buffer 5A via the internal bus adapter IBA, and is stored therein (step $S_{53}$). Then the tape head is positioned at the head of the block (step $S_{54}$).

When it is determined in step $S_{50}$ that the data in the logical block preceding the position of the current logical block resides in the multi-block buffer 5A, the data is recorded on the magnetic tape according to the processes from step $S_{42}$ to step $S_{48}$. That is, the data residing in the multi-block buffer 5A (the data in the logical block preceding the position of the current logical block) and the data newly issued from the host computer are made to coexist in the multi-block buffer 5A, and the formatter portion 6 integrates these data so that one reorganized physical block is obtained. The data thus reorganized into one physical block is then written on the magnetic tape.

A description will now be given of the process which is effected when, in one given block, the write command WR is issued from the host computer after the execution of the read command RD, with reference to FIGS. 14 and 15. The read command RD and the write command WR are separately processed as described above.

Figure 14:
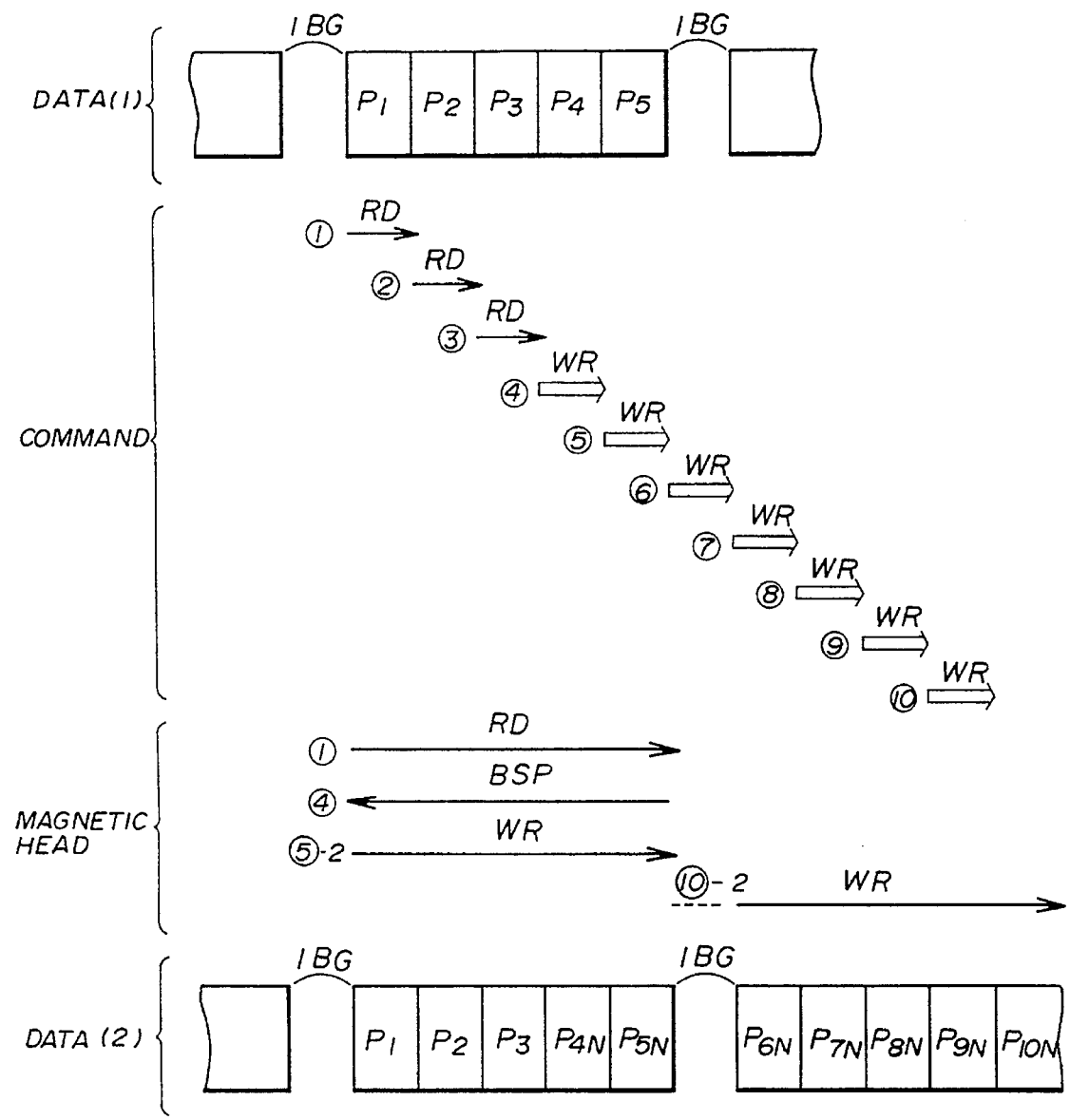
FIGS. 14 and 15 illustrate a data recording control method according to the described embodiment of the present invention.

As shown in FIG.14, in a case in which the read commands RD ①–③ are executed on the data in the packets $P_1$–$P_3$ belonging to the physical block consisting of five packets $P_1$–$P_5$, and subsequently the write commands WR ④–⑩ are sequentially executed, the following process is carried out.

Figure 15:
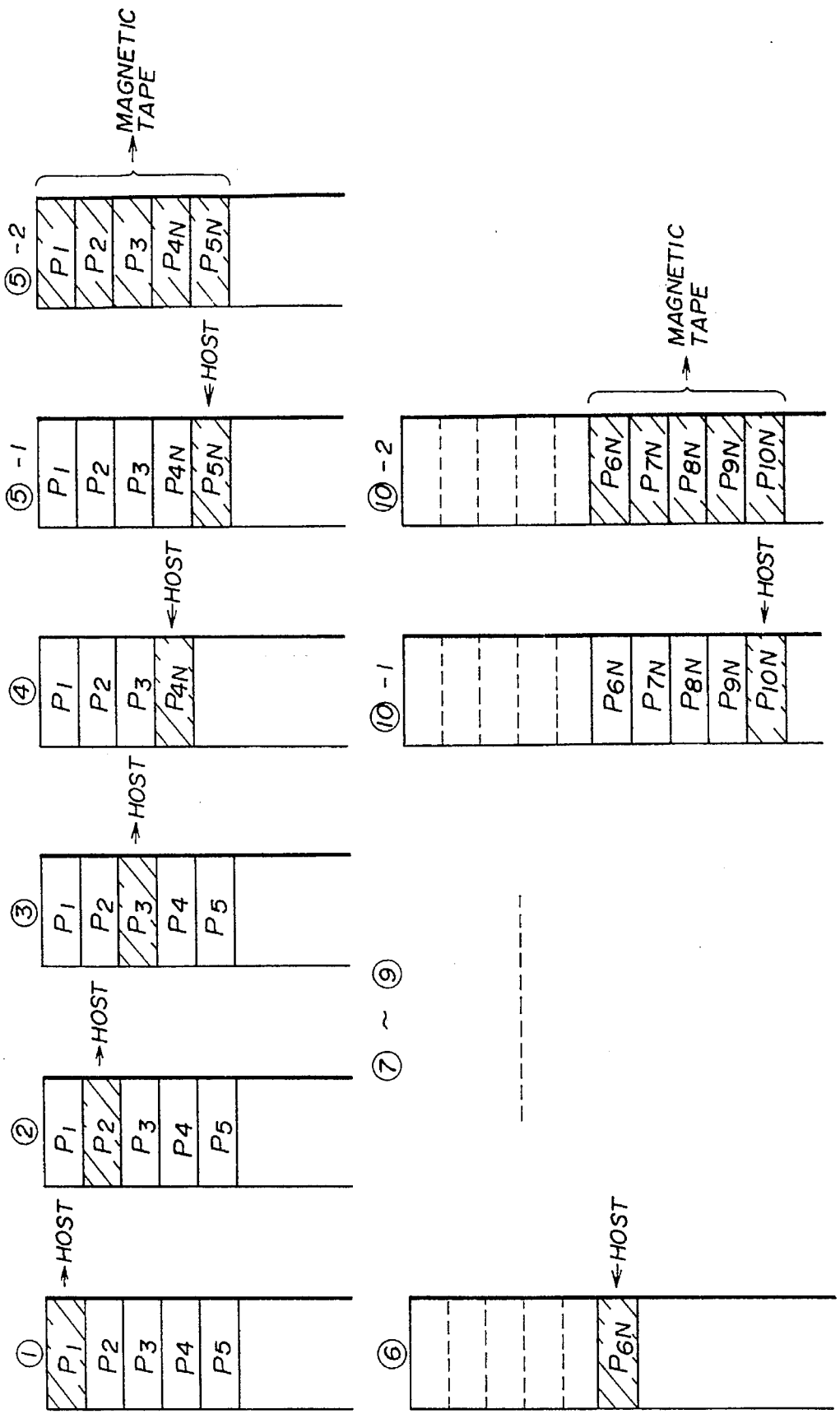

First, after the read command RD ① is executed on the data in the packet $P_1$, the tape head reads all the data in the physical block consisting of the packets $P_1$–$P_5$ from the magnetic tape, and then the data are stored in the multi-block buffer 5A, as shown in FIG. 15 ①. In correspondence to the read command RD ①, the data in the packet $P_1$ is transferred from the multi-block buffer 5A to the host computer. In response to the read commands RD ② and ③ issued from the host computer, the data in the packets $P_2$ and $P_3$ are transferred from the multi-block buffer 5A to the host computer, as shown in FIG. 15 ② and ③. When the write command WR ④ is then output from the host computer, the tape head is positioned at the head of the physical block. Since all the data in the packets $P_1$, $P_2$, and $P_3$, which packets precede the packet $P_4$ corresponding to the current logical block, are stored in the multi-block buffer 5A, the new data $P_{4N}$ output together with the write command WR ④ from the host computer is stored after the data in the packet $P_3$ in the multi-block buffer 5A, as shown in FIG.15. ④. When the write command WR ⑤ is output from the host computer, the new data $P_{5N}$ issued together with this write command is stored in the multi-block buffer 5A, as shown in FIG.15 ⑤-1. If the data series $(P_1, P_2, P_3, P_{4N}, P_{5N})$ stored in the multi-block buffer 5A fulfills the block close condition, the data are written on the magnetic tape as one physical block (FIG. 15 ⑤-②). Thereafter, as the write commands ⑥, ⑦, ⑧, ⑨, and ⑩ are sequentially output from the host computer, new write data $P_{6N}$, $P_{7N}$, $P_{8N}$, $P_{9N}$, and $P_{10N}$ which are output together with these write commands WR are sequentially stored in the multi-block buffer 5A (FIG. 15 ⑥–⑩ -1). If these write data $P_{6N}$–$P_{10N}$ fulfill the block close condition, the IBG is provided after the data block consisting of the data $P_1$, $P_2$, $P_3$, $P_{4N}$, and $P_{5N}$. After the IBG is provided, the data $P_{6N}$–$P_{10N}$ are written, as one physical block, on the magnetic tape via the tape head.

It is possible to effect the above-described data recording control of the magnetic tape, by using a firmware. In this case, the magnetic tape control apparatus is configured as shown in FIG. 16.

Figure 16:
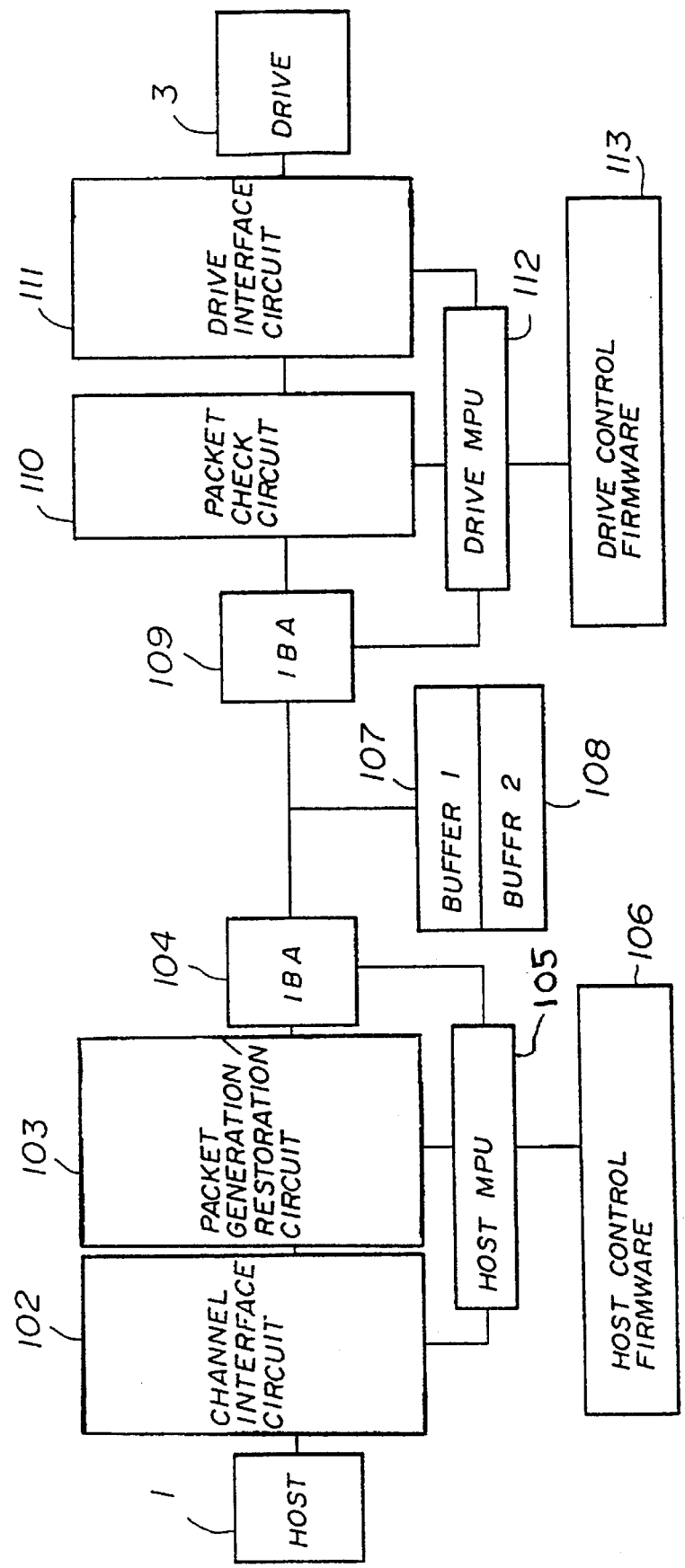
FIG. 16 is a block diagram illustrating still another schematic configuration of the magnetic tape control apparatus of the described embodiment of the present invention.

Referring to FIG. 16, the magnetic tape control apparatus is composed, in the same manner as the aforementioned magnetic tape control apparatus, of a host control portion functionally connected to the host computer 1, a drive control portion functionally connected to the drive 3, and the buffers 107 and 108. The host control portion is composed of a channel interface circuit 102, a packet generation/ restoration circuit 103, an internal bus adapter (IBA) 104, a host MPU 105, and a host control firmware 106. The host control firmware 106 controls the entire host control portion. The drive control portion is composed of an internal bus adapter (IBA) 109, a packet check circuit 110, a drive interface circuit 111, a drive MPU 112, and a drive control firmware 113. The drive control firmware 113 controls the entire drive control portion. The buffer 107 stores the data storage information of the buffer 108.

When the magnetic control apparatus receives the write command WR from the host computer 1, the magnetic tape control apparatus effects data recording control in accordance with the flow chart shown in FIGS. 12 and 13. The steps in this flow will be described briefly below.

In step $S_{41}$, where it is determined whether or not the current logical block is positioned in the middle of the block, the following steps are effected.

Figure 1:
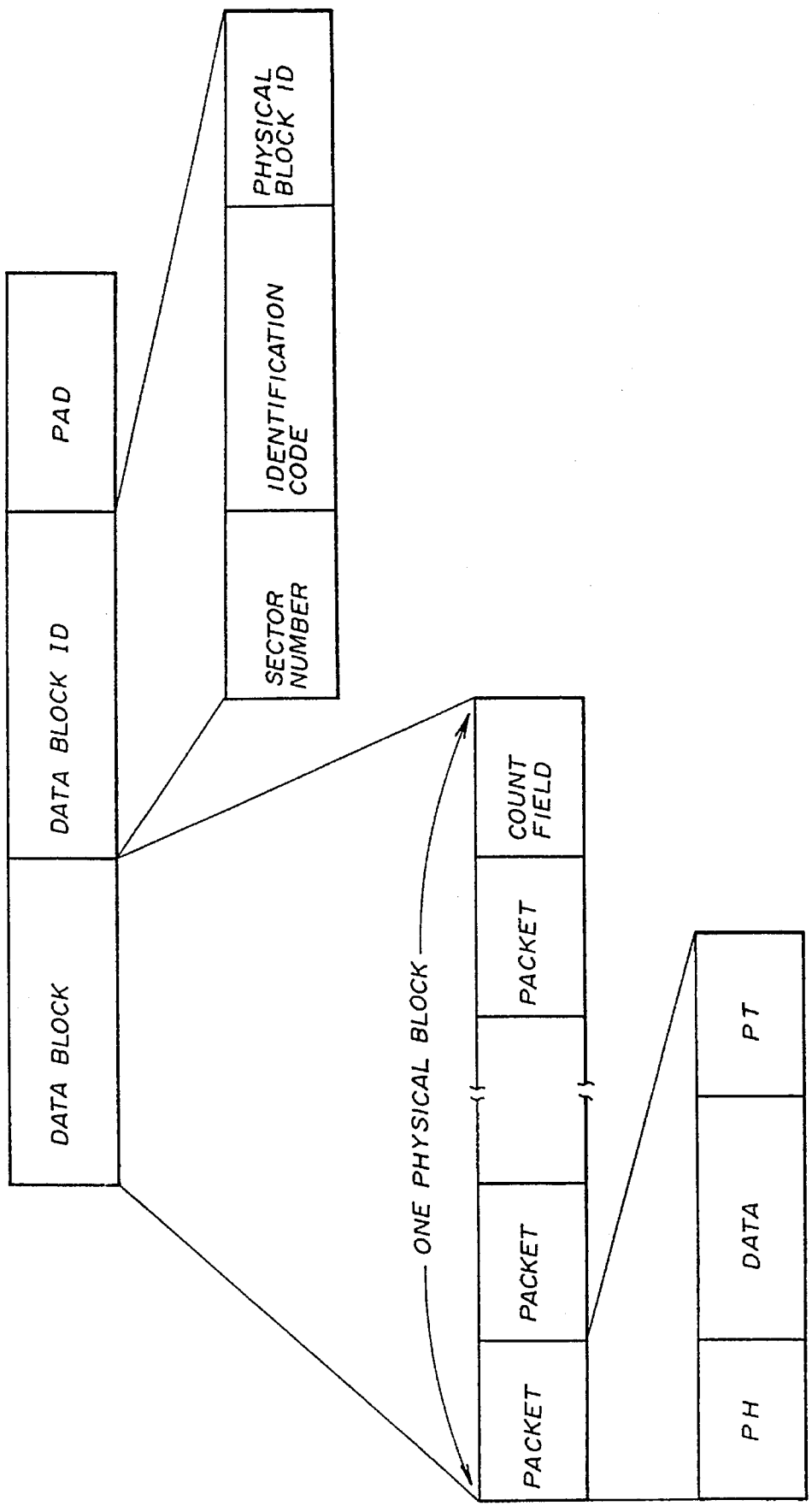
FIG. 1 illustrates an extended data format.
Figure 2:
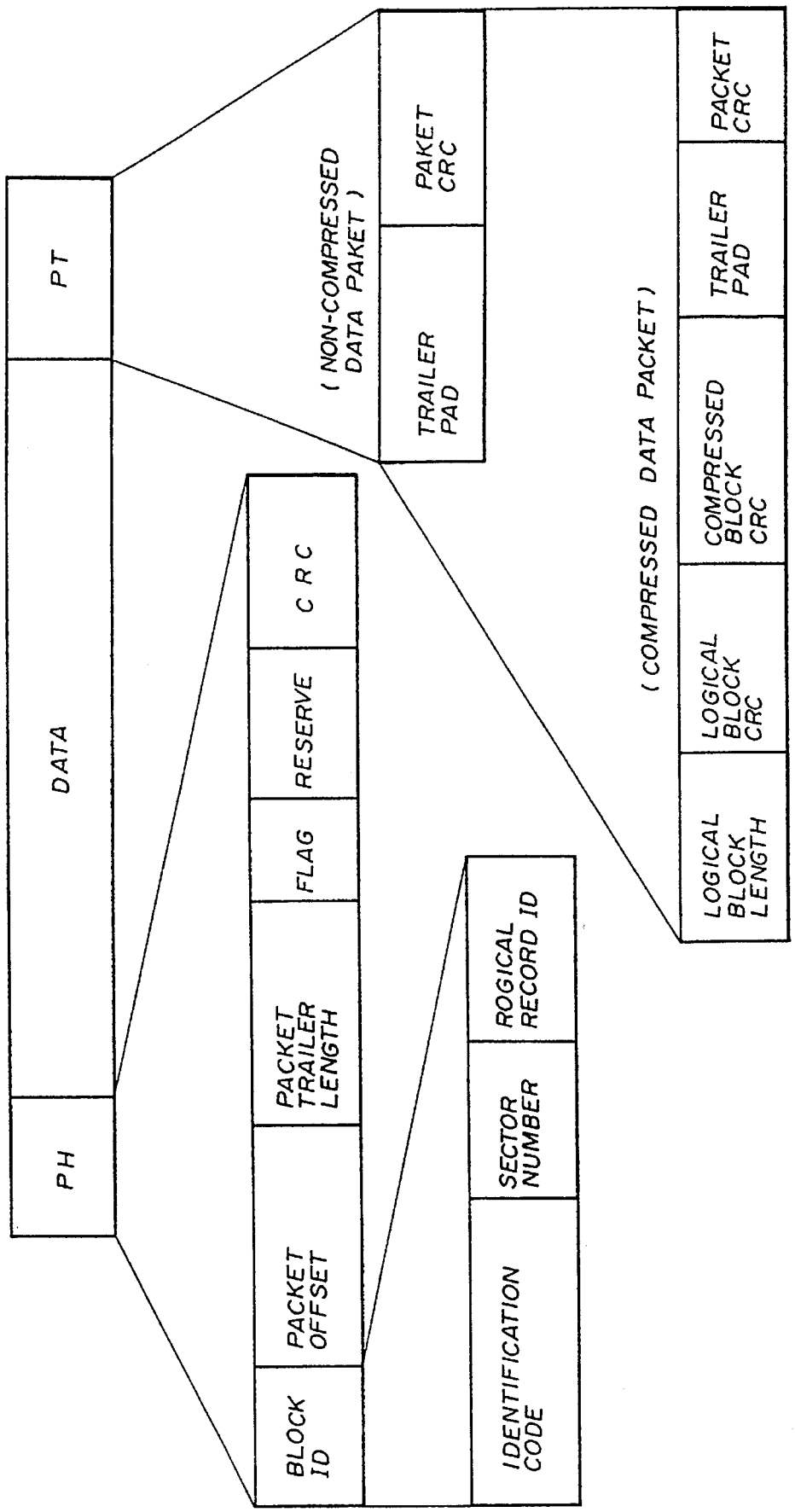
FIG. 2 illustrates a packet format.
Figure 3:
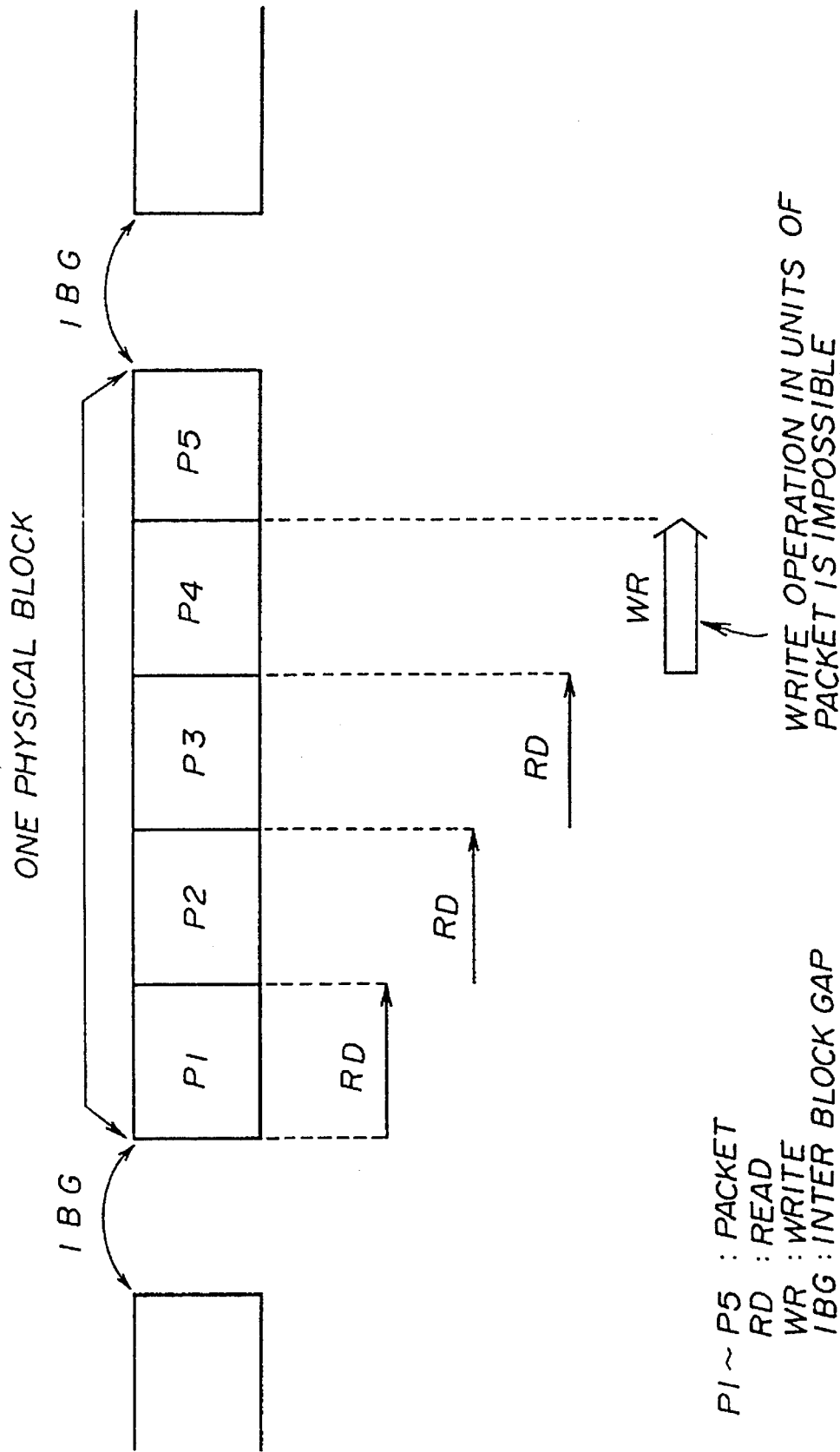
FIG. 3 illustrates a conventional data recording control method.
Figure 4:
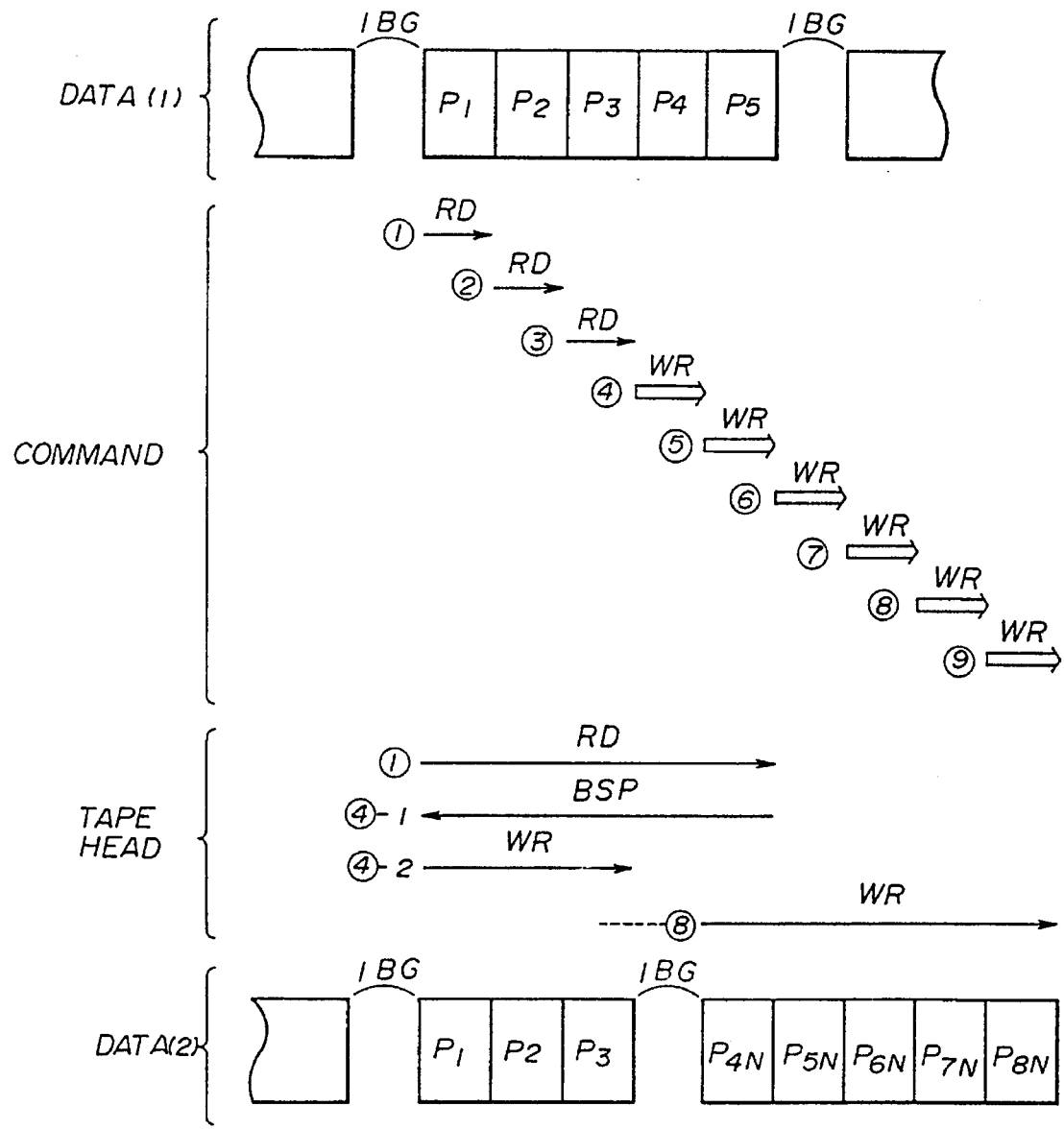
FIGS. 4 and 5 illustrate another conventional data recording control method.
Figure 5:
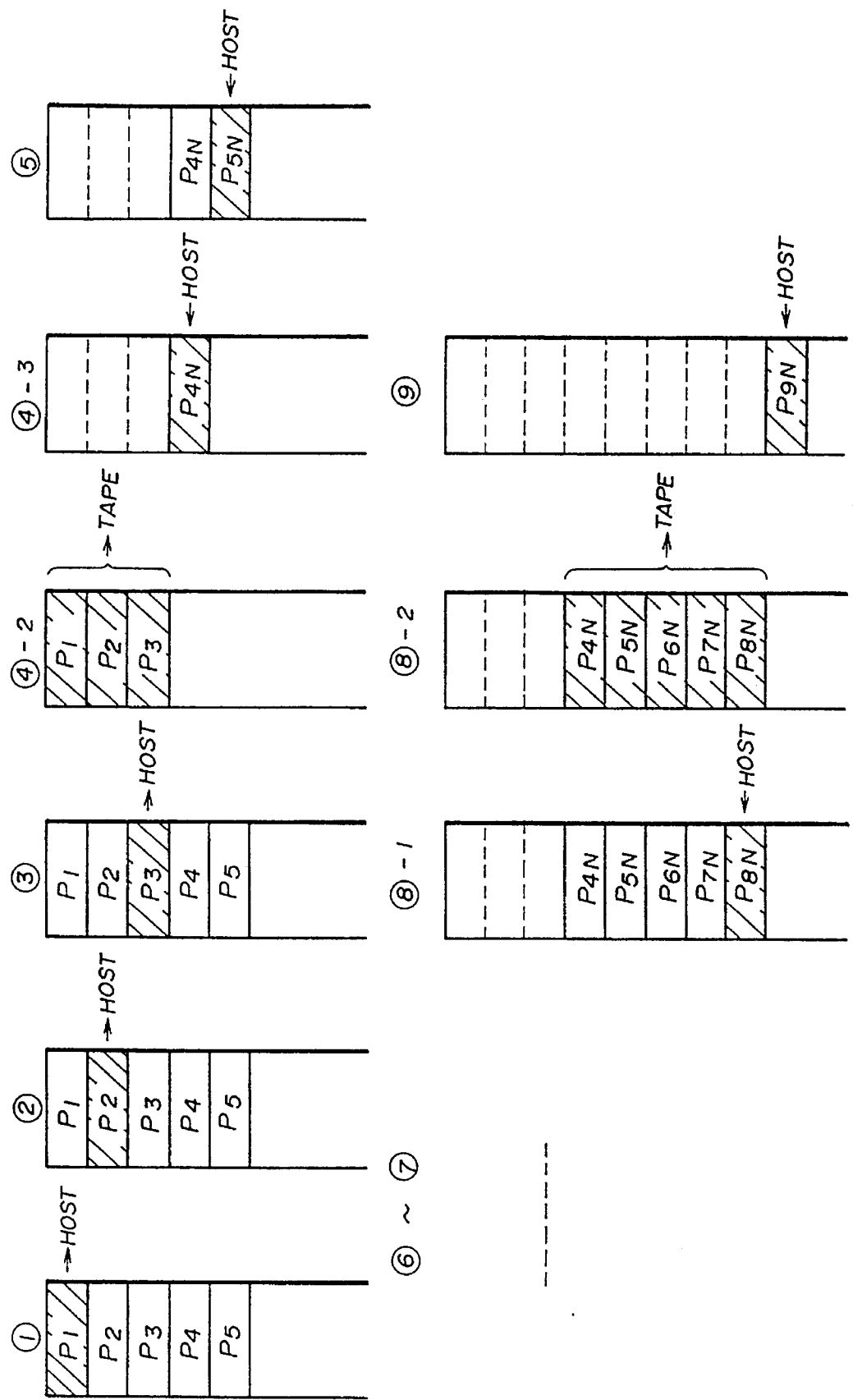

When the read command is being processed, the drive 3 reads all the data in one physical block. A count field (see FIG. 1), located at the end of the physical block, stores a packet count indicating the number of packets residing in the physical block. The drive control firmware 113 stores this count when the data in one physical block is read. The host control firmware 106 reads the data requested by the host computer 1 from the buffer 108. Each time the data is read from the buffer 108 in packet units, the drive control firmware 113 decrements the packet count by one. When the magnetic tape control apparatus receives the write command WR under such a condition, the drive control firmware 113 checks the number of remaining packets. When the number of remaining packets is found to be "0" it is determined that the current logical block corresponds to the last packet; when it is found that the number of remaining packets is not "0" it is determined that the current logical block corresponds to the packet in the middle of one physical block.

In step $S_{49}$, in which the tape head is positioned at the head of the physical block, the drive control firmware 113 issues the back space (BPS) command via the drive interface circuit 111, and the drive 3 positions the tape head at the IBG immediately preceding the physical block in question.

In step $S_{50}$, in which it is determined whether or not the data preceding the current logical block resides in the buffer 108 (MBB), the following operations are effected.

When the data is read in response to the read command, the data in the packet preceding the packet corresponding to this read command remains in the buffer 108. However, when the tape head is positioned at a predetermined position by means of a space (SP) or a locator command (LOC), no data resides in the buffer 108. That is, the drive control firmware 113 determines whether or not the desired data resides in the buffer 108 depending on what kind of command was issued immediately before the issuance of the write command WR.

If in the above-mentioned step $S_{50}$ the answer is "YES" the process returns to step $S_{42}$, and the normal operations are effected. On the other hand, if in step $S_{50}$ the answer is "NO" step $S_{51}$ allows the drive control firmware 113 to read one physical block of data from the drive 3, and the drive interface circuit 111 restores the data according to the format on the tape. Thereafter, step $S_{52}$ allows the drive control firmware 113 to control the packet check circuit 110 so that the contents of the packet header PH and the packet trailer PT are checked. Step $s_{53}$ allows the data to be stored in the buffer 108 via the internal bus adapter (IBA) 109. The information relative to this data storage is stored in the buffer 107. Then the process returns to step $S_{49}$.

As described above, use of the firmware enables the aforementioned autoblocking function to be achieved without increasing the size of hardware.

This invention is not limited to the above embodiments, but various other modifications and variations are possible without departing from the scope of the present invention.

We claim:

1. A data recording control method of a magnetic tape in which tape data is stored in extended fixed block size format constructed by combining a plurality of packets into a physical block, each packet corresponding to a data unit handled by a host unit issuing a read command and a write command applied to a magnetic tape, said method comprising steps of:

(a) reading, from the magnetic tape, when a read command for reading at least one packet in the physical block is output from the host unit, the data in the entire physical block including that packet, and storing the data in the entire physical block including that packet in a buffer;

(b) reorganizing, at any position in said physical block on the magnetic tape, the physical block using the packet in the buffer and new data to be recorded, when a write command and new data to be recorded are output from the host unit, while replacing data other than the at least one packet commanded to be read by the host with the new data; and (c) recording, on the magnetic tape, the data thus reorganized as the physical block.

2. The data recording control method of a magnetic tape as claimed in claim 1, wherein said step (b) comprises a step of reorganizing, into the physical block: the packet data preceding the position in said physical block at which position the write command is issued from the host unit; and the new data to be recorded.

3. The data recording control method of a magnetic tape as claimed in claim 1, wherein said step (c) comprises a step of recording the reorganized data starting from a head position of the physical block from which block the data is read in step (a).

4. The data recording control method of a magnetic tape, wherein the step of recording the reorganized data as claimed in claim 3 comprises a step of positioning, when a write command is issued from the host unit, the recording/ reproducing head at a head position of the physical block from which block the data is read in step (a).

5. The data recording control method of a magnetic tape as claimed in claim 1, wherein, in said step (a), data are stored in the buffer in packet units.

6. The data recording control method of a magnetic tape as claimed in claim 5, wherein, in step (c), the new data to be recorded is stored in the buffer in packet units, and data reorganization is effected in said buffer.

7. The data recording control method of a magnetic tape as claimed in claim 1, wherein said step (b) comprises steps of: determining whether or not the data to be reorganized fulfills a predetermined close condition; and designating said data as one physical block when it is determined in said step that the close condition is fulfilled.

8. A data recording control method of a magnetic tape in which tape data is constructed by combining a plurality of packets into a physical block, each packet corresponding to a data unit handled by a host unit issuing a read command and a write command applied to a magnetic tape, said method comprising steps of:

(a) reading, from the magnetic tape, when a read command for reading at least one packet in the physical block is output from the host unit, the data in the entire physical block including that packet, and storing the data in the entire physical block including that packet in a buffer;

(b) reorganizing, at any position in said physical block on the magnetic tape, the physical block using the packet in the buffer and new data to be recorded, when a write command and new data to be recorded are output form the host unit, while replacing data other than the at least one packet commanded to be read by the host with the new data; and (c) recording, on the magnetic tape, the data thus reorganized as the physical block.

9. A data recording control apparatus for reading tape data from and recording tape data to a magnetic tape in which the tape data is stored in extended fixed block size format constructed by combining a plurality of packets into a physical block, each packet corresponding to a data unit handled by a host unit issuing a read command and a write command applied to the magnetic tape, said apparatus comprising:

means for reading, from the magnetic tape, when a read command for reading at least one packet in the physical block is output from the host unit, the data in the entire physical block including that packet, and storing the data in the entire physical block including that packet in a buffer;

means for reorganizing, at any position in said physical block on the magnetic tape, the physical block using the packet in the buffer and new data to be recorded, when a write command and new data to be recorded are output from the host unit, while replacing data other than the packet commanded to be read by the host with the new data; and means for recording, on the magnetic tape, the data thus reorganized as the physical block.

10. The apparatus according to claim 9, wherein said means for reorganizing reorganizes, into the physical block, the packet data preceding the position in said physical block at which position the write command is issued from the host unit and new data to be recorded.

11. The apparatus according to claim 9, wherein said means for recording records the reorganized data starting from a head position of the physical block from which block the data is read by said means for reading.

12. The apparatus according to claim 11, wherein the means for recording further positions, in response to a write command from the host unit, a recording/reproducing head at a head position of the physical block from which block the data is read by said means for reading.

13. The apparatus according to claim 9, wherein data are stored in the buffer in packet units.

14. The apparatus according to claim 13, wherein new data to be recorded is stored in the buffer in packet units, and data reorganization is effected in said buffer.

15. The apparatus according to claim 9, wherein said means for reorganizing further determines whether or not the data to be reorganized fulfills a predetermined close condition and designates said data as one physical block when it is determined that the close condition is fulfilled.

* * * * *

UNITED STATES PATENT AND TRADEMARK OFFICE
CERTIFICATE OF CORRECTION

PATENT NO. : 5,612,829
DATED : March 18, 1997
INVENTOR(S) : Takai et al

It is certified that error appears in the above-identified patent and that said Letters Patent is hereby corrected as shown below:

In the Abstract, lines 5 and 6 delete "and store in a buffer" and insert --and stored in a buffer-- therefor.

Column 3, line 67, delete "block,is" and insert --block, is-- therefor.

Column 7, line 20, delete "conducts process" and insert --conducts the process-- therefor.

UNITED STATES PATENT AND TRADEMARK OFFICE
CERTIFICATE OF CORRECTION

PATENT NO. : 5,612,829
DATED : March 18, 1997
INVENTOR(S) : Takai et al

It is certified that error appears in the above-identified patent and that said Letters Patent is hereby corrected as shown below:

Column 7, lines 37-38, do not start new paragragh, delete spaces between "therein" and "(Step $S_{44}$)."

Column 7, line 45, delete "packets $P_1z$-Pn" and insert packets $P_1$-Pn-- therefor.

Column 11, line 18, delete "output form" and insert --output from-- therefor.

Signed and Sealed this

Twenty-sixth Day of May, 1998

*Attest:*

BRUCE LEHMAN

*Attesting Officer*    Commissioner of Patents and Trademarks